J. REEL.
NUT LOCK.
APPLICATION FILED SEPT. 18, 1911.
1,052,380.
Patented Feb. 4, 1913.
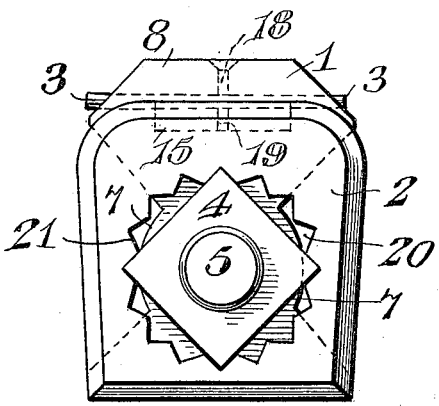
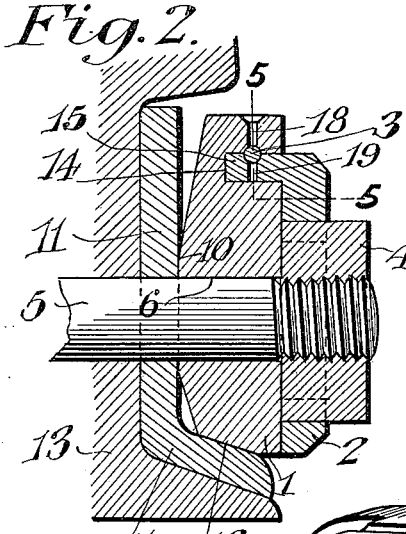
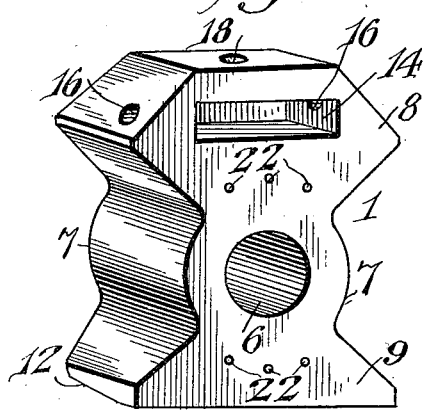
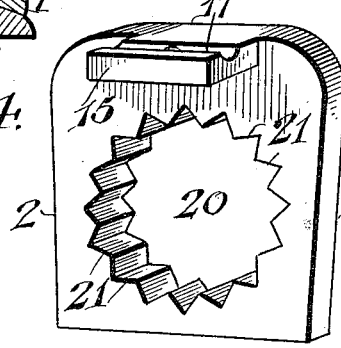
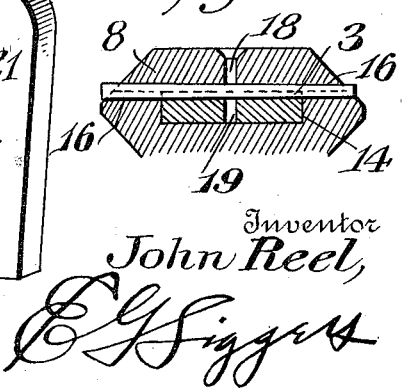
Witnesses
Jas. K. McCathran
H. F. Riley
Inventor
John Reel,
By C. G. Siggers
Attorney

UNITED STATES PATENT OFFICE.

JOHN REEL, OF WEIR, MISSISSIPPI, ASSIGNOR OF ONE-HALF TO JOHN SNEED POWELL, OF STEWART, MISSISSIPPI.

NUT-LOCK.

1,052,380.  Specification of Letters Patent.  Patented Feb. 4, 1913.

Application filed September 18, 1911. Serial No. 649,939.

*To all whom it may concern:*

Be it known that I, JOHN REEL, a citizen of the United States, residing at Weir, in the county of Choctaw and State of Mississippi, have invented a new and useful Nut-Lock, of which the following is a specification.

The invention relates to improvements in nut locks.

The object of the present invention is to improve the construction of nut locks, and to provide a simple, efficient and inexpensive device, designed for use on rail joints and the bolts of other parts subject to vibration, and adapted to be readily applied to the same without necessitating any alteration in the construction of the bolts or nuts, and capable of effectually preventing a nut from unscrewing.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a front elevation of a nut lock, constructed in accordance with this invention. Fig. 2 is a vertical sectional view of the same and a portion of a rail joint. Fig. 3 is a perspective view of the base plate. Fig. 4 is a detail perspective view of the locking plate. Fig. 5 is a detail sectional view on the line 5—5 of Fig. 2.

Like numerals of reference designate corresponding parts in all the figures of the drawing.

In the accompanying drawing in which is illustrated the preferred embodiment of the invention, the nut lock comprises in its construction a base plate 1, a locking plate 2 and a pin or key 3, which detachably secures the locking plate to the base plate for maintaining the locking plate in engagement with the nut 4 of a bolt 5. The base plate is provided near its center with a bolt opening 6, and it is recessed or cut-away at opposite sides at 7, forming upper and lower winged portions or enlargements 8 and 9. The rear or inner face 10 of the base plate is adapted to fit against the fish plate 11 of a rail joint, or other part to be bolted in place, and its lower edge or bottom 12 is beveled to enable it to fit snugly against the angle fish plate 11, and it is adapted to engage either the bottom flange of an angle gage fish plate or the bottom flange of a rail 13, whereby it is held against rotary movement on the bolt. In the accompanying drawing, the base plate is shown fitted against the bottom flange of the fish plate and when it is designed for engaging the rail it will be of sufficient size to extend to the portion of the rail to be engaged by it. The inner or rear face 10 is vertical at the central portion around the bolt opening 6, and the upper and lower portions are preferably inclined, as clearly shown in Fig. 2 of the drawing. The top portion of the base plate may engage under the head of the rail, and this engagement may, if desired, be utilized to prevent rotary movement of the base plate on the bolt 5.

The upper portion 8 of the base plate 1 is provided with a horizontal slot or recess 14 for the reception of a flange 15, extending inwardly or rearwardly from the upper portion of the locking plate and secured in the slot or recess 14 by the said pin or key 3. The slot or recess 14 may extend entirely through the upper portion of the base plate, or it may terminate short of the rear face of the same, as illustrated in the accompanying drawing. The upper portion 8 of the base plate is also provided with a horizontal bore or opening 16, extending entirely through the said upper portion 8 and adapted to receive the pin or key 3, and to permit the same to project from either side of the locking plate, whereby ready access is had to the key for driving the same out of the bore or opening 16 when it is desired to remove the locking plate. The bore or opening 16 is intersected by the slot or recess 14, and the flange 15, which is formed integral with the locking plate 2, is provided in its upper face with a groove 17 registering with the opposite portions of the bore or opening, when the flange is fitted in the slot or recess 14, whereby the pin or key 3 is interlocked with the flange and is adapted to securely fasten the locking plate to the base plate. The upper portion 8 of the base plate and the flange 15 of the locking plate are provided with registering vertical openings 18 and 19, forming a passage and adapted to receive a pin or key for locking the flange in the slot or recess of the base plate, should conditions of the use of the nut lock require such an arrangement of the pin or key, or render the same desirable. When a horizontal pin or key is employed, the vertical opening 18 of the locking plate is adapted to form an oil cup or receptacle for enabling a small quantity of oil to be introduced into the bore or opening 16 to facilitate the removal of the pin or key should the parts become rusty.

The locking plate, which is approximately rectangular, is provided with a nut receiving opening 20, and it has an annular series of notches 21, formed in the edges of the locking plate at the opening 20 and adapted to receive the corners of the nut 4, whereby the nut is securely held against rotary movement. Although a square nut is illustrated in the accompanying drawing, the device is applicable to hexagonal and other forms of nuts. In order to enable the corners of a nut to fit accurately the notches 21, the base plate against which the nut is screwed, is provided in its front or outer face with a plurality of indicating marks 22, formed by indentations or other means and corresponding with the positions of the notches 21, so that a nut may be accurately screwed to a position in which its corners will fit in the notches 21 of the locking plate when the latter is applied to the base plate. When it is desired to remove a nut for any purpose, the locking plate is detached and the nut may be unscrewed without destroying or injuring either the locking plate or the base plate.

Having thus fully described my invention, what I claim as new and desire to secure by Letters Patent, is:

A nut lock including a vertical bolt receiving base plate provided near its center with a bolt opening and having upper and lower enlargements, the lower enlargement being inclined at the lower edge to fit the bottom flange of a fish plate or the bottom of a rail, and the upper enlargement being provided with a recess located above and spaced from the bolt opening, a locking plate having a polygonal nut receiving opening and provided at its inner face with a flange arranged to enter the recess, said base plate being provided with a horizontal bore cutting the recess to form a groove in one of the walls thereof and the said flange being provided in its corresponding face with a horizontal groove, which coöperates with the groove of the recess to form an interior bore, and the said base plate and the flange being also provided with registering vertical openings forming a passage extending downwardly from the upper edge of the base plate and intersecting the interior bore, the horizontal bore and the vertical passage permitting a locking pin to be arranged in either a vertical or horizontal position and the vertical passage also constituting an oil cup to permit a lubricant to be supplied to the bore when a horizontal locking pin is used.

In testimony, that I claim the foregoing as my own, I have hereto affixed my signature in the presence of two witnesses.

JOHN REEL.

Witnesses:
L. A. SISK,
WILLIE BURFERD.

Copies of this patent may be obtained for five cents each, by addressing the "Commissioner of Patents, Washington, D. C."